United States Patent
Hahne

(10) Patent No.: US 9,477,227 B2
(45) Date of Patent: Oct. 25, 2016

(54) DRIVER ASSISTANCE SYSTEM AND METHOD FOR OPERATING A DRIVER ASSISTANCE SYSTEM

(71) Applicant: GM GLOBAL TECHNOLOGY OPERATIONS LLC, Detroit, MI (US)

(72) Inventor: Uwe Hahne, Mauchenheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 118 days.

(21) Appl. No.: 14/460,136

(22) Filed: Aug. 14, 2014

(65) Prior Publication Data

US 2015/0051780 A1 Feb. 19, 2015

(30) Foreign Application Priority Data

Aug. 14, 2013 (DE) .......................... 10 2013 013 539

(51) Int. Cl.
  *G05D 1/00* (2006.01)
  *B60W 30/09* (2012.01)
  *B60W 50/12* (2012.01)
  *B60W 50/14* (2012.01)

(52) U.S. Cl.
  CPC ............ *G05D 1/0061* (2013.01); *B60W 30/09* (2013.01); *B60W 50/12* (2013.01); *B60W 50/14* (2013.01); *G05D 2201/0213* (2013.01)

(58) Field of Classification Search
  CPC .... B60W 30/09; B60W 50/12; B60W 50/14; G05D 1/61; G05D 2201/0213; G05D 1/0061; B62B 2501/065; B62B 9/102; B62B 9/14
  USPC .............................................. 701/23, 93, 96
  See application file for complete search history.

(56) References Cited

U.S. PATENT DOCUMENTS

| | | | |
|---|---|---|---|
| 5,775,456 A * | 7/1998 | Reppas | 180/322 |
| 8,317,329 B2 * | 11/2012 | Seder et al. | 353/13 |
| 8,433,470 B1 * | 4/2013 | Szybalski et al. | 701/23 |
| 2004/0210375 A1 * | 10/2004 | Heyse | 701/93 |
| 2005/0027428 A1 * | 2/2005 | Glora et al. | 701/93 |
| 2005/0278083 A1 * | 12/2005 | Shikano | B60K 37/06 701/1 |
| 2006/0195231 A1 * | 8/2006 | Diebold | B60R 21/013 701/1 |
| 2008/0015772 A1 * | 1/2008 | Sanma | B60K 35/00 701/408 |
| 2008/0065293 A1 * | 3/2008 | Placke et al. | 701/41 |

(Continued)

FOREIGN PATENT DOCUMENTS

| | | |
|---|---|---|
| DE | 102012001312 A1 | 8/2012 |
| DE | 102013003214 A1 | 9/2013 |

OTHER PUBLICATIONS

German Search Report conducted Aug. 7, 2014 in DE 102013013539.7.

*Primary Examiner* — Calvin Cheung
*Assistant Examiner* — Angelina Shudy
(74) *Attorney, Agent, or Firm* — Lorenz & Kopf LLP

(57) ABSTRACT

A driver assistance system and a method for operating a driver assistance system are disclosed. The driver assistance system includes an actuation device configured for automatically actuating a brake unit, a drive unit or a steering unit. An input device enters a user request for a driving maneuver executable by the driver assistance. A releasing device selectively releases an operation of the driver assistance system based on whether a release for the driver assistance system to be operated by the passenger of the motor vehicle is effected by the driver of the motor vehicle by means of the releasing device.

14 Claims, 6 Drawing Sheets

(56) References Cited

U.S. PATENT DOCUMENTS

| | | | | |
|---|---|---|---|---|
| 2008/0231603 A1* | 9/2008 | Parkinson | B60K 35/00 345/173 |
| 2009/0098815 A1* | 4/2009 | Hotary | B60H 1/00742 454/75 |
| 2010/0250044 A1* | 9/2010 | Alasry | B60K 37/00 701/31.4 |
| 2011/0121958 A1* | 5/2011 | Waller | B60K 35/00 340/438 |
| 2013/0191003 A1* | 7/2013 | Hahne et al. | 701/99 |
| 2014/0121898 A1* | 5/2014 | Diab | G11B 20/00086 701/36 |
| 2014/0188322 A1* | 7/2014 | Oh | B60W 30/00 701/23 |
| 2014/0188920 A1* | 7/2014 | Sharma | G06F 17/30761 707/758 |
| 2015/0203126 A1* | 7/2015 | Kobana et al. | 701/93 |
| 2015/0379362 A1* | 12/2015 | Calmes | G06K 9/2036 348/136 |
| 2016/0082976 A1* | 3/2016 | Sugioka | B60W 50/0098 701/23 |
| 2016/0103499 A1* | 4/2016 | Yamamoto | G06F 3/017 345/156 |

\* cited by examiner

DRIVER ASSISTANCE SYSTEM AND METHOD FOR OPERATING A DRIVER ASSISTANCE SYSTEM

CROSS REFERENCE TO RELATED APPLICATION

This application claims priority to German Patent Application No. 102013013539.7 filed Aug. 14, 2013, which is incorporated herein by reference in its entirety.

TECHNICAL FIELD

The technical field relates to a driver assistance system for a motor vehicle, a method for operating a driver assistance system, a computer program product and a computer-readable medium.

BACKGROUND

DE 10 2012 001 312 A1 discloses a driver assistance system in a vehicle, where an operating command can be entered by means of an input device. If such an input takes place, an autonomously executable driving maneuver can be initiated via a control device and the driving maneuver can be modified, as required, in dependence of environmental data detected by environmental sensors.

SUMMARY

In accordance with the present disclosure, various embodiments for a driver assistance system for a motor vehicle, a method for operating a driver assistance system, a computer program product and a computer-readable medium are provided which permit a further improvement in driving safety.

According to one aspect of the present disclosure a driver assistance system for a motor vehicle is proposed, wherein the driver assistance system includes an actuating device selected from the group consisting of a brake unit, a drive unit, and a steering unit. The actuating device is configured for automatic actuation of at least one element of the motor vehicle. Further, the driver assistance system includes an input device for entering a user request for at least one driving maneuver executable by the driver assistance system and a releasing device for releasing an operation of the driver assistance system. Moreover the driver assistance system includes a computer unit and a computer program product which when executed on the computer unit instructs the computer unit to execute the following steps. The computer unit is instructed to determine whether a release for the driver assistance system to be operated by the passenger of the motor vehicle is effected by the driver of the motor vehicle by the releasing device. If it is determined that a release for the driver assistance system to be operated by the passenger of the motor vehicle is effected by the driver of the motor vehicle by means of the releasing device, the computer unit is instructed to release operation of the driver assistance system for a passenger of the motor vehicle.

The driver assistance system according to the embodiment permits a further improvement in driving safety. In particular this is effected by determining whether a release for the driver assistance system to be operated by the passenger of the motor vehicle is effected by the driver of the motor vehicle by the releasing device, and by releasing the operation of the driver assistance system for the passenger of the motor vehicle if such a release is effected by the driver of the motor vehicle. This has the advantage of preventing an actuation of the driver assistance system by the passenger, if the actuation is not desired by the driver. Further, if desired by the driver of the motor vehicle, the driving operation can be monitored by the passenger of the motor vehicle, in particular in case a driving maneuver is autonomously executed by means of the driver assistance system, and the passenger can intervene to control the driving operation of the motor vehicle or the operation of the driver assistance system by a respective operation of the driver assistance system. In this way the driver of the motor vehicle, in a situation where the motor vehicle is autonomously operated by the driver assistance system can be offered the chance to relax without endangering driving safety.

In one embodiment of the driver assistance system, the releasing device includes a biometric person recognition device. In the embodiment the determining as to whether a release for the driver assistance system to be operated by the passenger of the motor vehicle is effected by the driver of the motor vehicle by means of the releasing device, is based on data ascertained by the biometric person recognition device. This is a means of reliably determining whether releasing the operation is carried out by the driver of the motor vehicle.

To this end the biometric person recognition device includes, for example, a finger print sensor or a voice recognition unit. Further the biometric person recognition device may include an optical camera, wherein the releasing device, as well as the area of a driver's seat of the motor vehicle, is arranged, at least partially, within a detection range of the optical camera. In this way it is possible to determine by means of image evaluation of images captured by the optical camera, whether release of the operation is effected by the driver of the motor vehicle.

In a further embodiment of the driver assistance system the releasing device includes an operating element arranged in the foot well of the driver. In the embodiment the determining as to whether a release for the driver assistance system to be operated by the passenger of the motor vehicle is effected by the driver of the motor vehicle by means of the releasing device, includes determining an actuation of the operating element. By arranging the releasing device in an area of the motor vehicle which is typically accessible only to the driver of the motor vehicle, it can be determined in a reliable manner, whether release of the operation is effected by the driver of the motor vehicle.

In case it is determined that a release for the driver assistance system to be operated by the passenger of the motor vehicle is effected by the driver of the motor vehicle by means of the releasing device, the computer unit, in a further embodiment, is instructed to perform the following steps. The computer unit is instructed to determine, via at least one first sensor of the motor vehicle, at least one parameter characteristic of a possible distraction of the passenger from a momentary traffic situation. Further the computer unit is instructed to determine a degree of distraction of the passenger from the momentary traffic situation based on the at least one determined parameter. Further the computer unit is instructed to issue a warning message via an output device of the motor vehicle, in case the degree of distraction of the passenger from the momentary traffic situation exceeds a predefined threshold value. In this way it is possible in situations, in which the driving operation is monitored by the passenger of motor vehicle, to determine a possible inattentiveness of the passenger and to alert the occupants of the motor vehicle, in particular the driver and the passenger, accordingly.

The at least one parameter characteristic of a possible distraction of the passenger from a momentary traffic situation is for example selected from the group consisting of a viewing direction of the passenger, the frequency with which the passenger closes at least one eyelid, a speed with which the at least one eyelid of the passenger is closed, a body temperature and a pulse frequency of the passenger.

In one embodiment the driver assistance system is configured to automatically perform the at least one driving maneuver executable via the driver assistance system based on data ascertained from at least one second sensor of the motor vehicle wherein the at least one second sensor is configured for detecting objects in the area of an environment of the motor vehicle. Thus the driving maneuver can be reliably adapted to the respective traffic situation.

The at least one second sensor may by selected from the group consisting of an electromagnetic sensor, in particular a radar sensor or a lidar sensor, an acoustic sensor, in particular an ultrasound sensor, and an optical camera. The sensors also called environmental sensors are increasingly employed in motor vehicles, so that the number of components required for the driver assistance system can be reduced in an advantageous manner.

In a further embodiment the driver assistance system is configured to automatically perform the at least one driving maneuver executable by means of the driver assistance system based on data received from a vehicle-to-vehicle communication device and/or a vehicle-to-infrastructure communications device of the motor vehicle. The communication devices are also called car-to-car (C2C) or vehicle-to-vehicle (V2V) or car-to-infrastructure (C2I) or vehicle-to-roadside (V2R) communication, or in summary car-to-X (C2X) or vehicle-to-X communication. This means that the driving maneuver also can be adapted to the traffic situation in a reliable manner.

Further the driver assistance system may be configured to automatically perform the at least one driving maneuver executable by means of the driver assistance system based on map data stored in a storage device. In this way the driving maneuver may be adapted to the respective environmental situation in an advantageous manner.

In particular, the driver assistance system may be configured to automatically perform at least one driving maneuver selected from the group consisting of a lane change of the motor vehicle, braking the motor vehicle, in particular braking the motor vehicle into a standstill, driving the motor vehicle at a constant speed and driving the motor vehicle at a constant distance from a preceding vehicle.

A further aspect of the present disclosure relates to a method for operating a driver assistance system wherein the driver assistance system includes an actuating device configured to automatically actuate at least one element of the motor vehicle, selected from the group consisting of a brake unit, a drive unit and a steering unit, an input device for entering a user request for at least one driving maneuver executable by means of the driver assistance system and a releasing device for releasing an operation of the driver assistance system. The method includes the following steps. It is determined whether a release for the driver assistance system to be operated by a passenger of the motor vehicle is effected by a driver of the motor vehicle by means of the releasing device. If it is determined that a release for the driver assistance system to be operated by the passenger of the motor vehicle is effected by the driver of the motor vehicle by means of the releasing device, then the driver assistance system is also released for operation by the passenger of the motor vehicle.

The method according to the embodiment already includes the advantages listed in conjunction with the respective driver assistance system, which will therefore not be reiterated here, in order to avoid repetitions.

In one embodiment of the method, in which the releasing device includes a biometric person recognition device, the determination as to whether a release for the driver assistance system to be operated by the passenger of the motor vehicle is effected by the driver of the motor vehicle by means of the releasing device, is effected on the basis of data ascertained by the biometric person recognition device.

In a further embodiment of the method in which the releasing device includes an operating element arranged in the area of a foot well of the driver, the determining as to whether a release for the driver assistance system to be operated by the passenger of the motor vehicle is effected by the driver of the motor vehicle by means of the releasing device, includes determining an actuation of the operating element.

The method can also include the following steps: ascertaining at least one parameter characteristic of a possible distraction of the passenger from a momentary traffic situation by means of at least one first sensor of the motor vehicle, ascertaining a degree of distraction of the passenger from a momentary traffic situation based on the at least one ascertained parameter, and in case the ascertained degree of distraction of the passenger from a momentary traffic situation exceeds a predefined threshold value, issuing a warning message.

In a further embodiment the method also includes the following steps: determining, whether a user request for performing the at least one driving maneuver executable by means of the driver assistance system is effected by the driver of the motor vehicle by means of the input device, and if it is determined that a user request for performing the at least one driving maneuver executable by means of the driver assistance system is effected by the driver of the motor vehicle by means of the input device, automatic execution of the at least one driving maneuver, wherein the determining as to whether a release for the driver assistance system to be operated by the passenger of the motor vehicle is effected by the driver of the motor vehicle by means of the releasing device, is effected during automatic execution of the at least one driving maneuver.

The determining as to whether a release for the driver assistance system to be operated by the passenger of the motor vehicle is effected by the driver of the motor vehicle by means of the releasing device, thus includes in the embodiment, determining whether a release for the driver assistance system to be operated by the passenger of the motor vehicle is effected by the driver of the motor vehicle by means of the releasing device. In this way monitoring of the driving operation can be effected by the passenger of the motor vehicle in case a driving maneuver is performed autonomously by means of the driver assistance system, and the passenger, in such a situation, can intervene to control the driving operation of motor vehicle by means of a respective operation of the driver assistance system.

Further, the method may also include the following steps: determining whether a take-over of the motor vehicle by the driver is necessary during automatic execution of the least one driving maneuver, and in case it is determined that a take-over of the motor vehicle by the driver is required during automatic execution of the least one driving maneuver, issuing a warning message. In this way the occupants of the motor vehicle and in particular the driver of the motor vehicle can be alerted to driving situations in which it is necessary for the driver to retake control of the vehicle from the driver assistance system.

A further aspect of the present disclosure relates to a computer program product which, when executed on a computer unit of a driver assistance system of a motor vehicle, wherein the driver assistance system includes an actuating device configured to automatically actuate at least one element of the motor vehicle selected from the group consisting of a brake unit, a drive unit and a steering unit, an input device for entering a user request for at least one driving maneuver executable by means of the driver assistance system and a releasing device for releasing an operation of the driver assistance system, instructs the computer unit to execute a method according to one of the embodiments, in particular a method which includes the following steps: determining whether a release for the driver assistance system to be operated by the passenger of the motor vehicle is effected by the driver of the motor vehicle by means of the releasing device, and if it is determined that a release for the driver assistance system to be operated by the passenger of the motor vehicle is effected by the driver of the motor vehicle by means of the releasing device, release of the operation of the driver assistance system for the passenger of the motor vehicle.

Moreover a further aspect of the present disclosure relates to a computer-readable medium on which a computer program product according to the embodiment has been stored. The computer program product and the computer-readable medium according to the embodiments, in conjunction with the respective driver assistance system, already include the advantages which will not be reiterated here, in order to avoid repetitions.

Further another aspect of the present disclosure relates to a device for operating a driver assistance system of a motor vehicle, wherein the driver assistance system includes an actuating device configured for automatic actuation of at least one element of the motor vehicle selected from the group consisting of a brake unit, a drive unit and steering unit, an input device for entering a user request for at least one driving maneuver executable by means of the driver assistance system and a releasing device for releasing the operation of the driver assistance system. The device for operating the driver assistance system includes means for determining whether a release for the driver assistance system to be operated by a passenger of the motor vehicle is effected by a driver of the motor vehicle by means of the releasing device. Further the device includes means for releasing the operation of the driver assistance system for the passenger of the motor vehicle in case it is determined that a release for the driver assistance system to be operated by a passenger of the motor vehicle is effected by the driver of the motor vehicle by means of the releasing device. The device for operating a driver assistance system is a means for further improving driving safety, as already explained.

In one embodiment, in which the releasing device includes a biometric person recognition device, the determining whether a release for the driver assistance system to be operated by a passenger of the motor vehicle is effected by a driver of the motor vehicle by means of the releasing device, is effected on the basis of data ascertained by the biometric person recognition device. This provides a reliable means for determining whether release of the operation is effected by the driver of the motor vehicle.

In a further embodiment, in which the releasing device includes an operating element arranged in the area of a foot well of the driver, the means for determining as to whether a release for the driver assistance system to be operated by a passenger of the motor vehicle is effected by a driver of the motor vehicle by means of the releasing device, include means for determining an actuation of the operating element. By arranging the releasing device in an area of the motor vehicle which is typically only accessible to the driver of the motor vehicle, it can be reliably determined whether release of the operation is effected by the driver of the motor vehicle.

The device for operating a driver assistance system may further include: means for ascertaining at least one parameter characteristic of a possible distraction of the passenger from a momentary traffic situation by means of at least one sensor of the motor vehicle, means for ascertaining a degree of distraction of the passenger from the momentary traffic situation based on the at the at least one ascertained parameter, means for issuing a warning message, and in case the ascertained degree of distraction of the passenger from the momentary traffic situation exceeds a predefined threshold value. In this way it is possible in situations, in which the driving operation is monitored by the passenger of motor vehicle, to determine a possible inattentiveness of the passenger and to alert the occupants of the motor vehicle, in particular the driver and the passenger, accordingly.

Further the device for operating a driver assistance system may include: means for determining, whether a user request for performing the at least one driving maneuver executable by means of the driver assistance system is effected by the driver of the motor vehicle by means of the input device, and means to automatically perform the at least one driving maneuver in case it is determined that a user request for performing the at least one driving maneuver executable by the driver assistance system is effected by the driver of the motor vehicle by means of the input device, wherein the determining as to whether a release for the driver assistance system to be operated by a passenger of the motor vehicle is effected by the driver of the motor vehicle by means of the releasing device, is effected during automatic execution of the at least one driving maneuver. In this way monitoring of the driving operation by the passenger of the motor vehicle can be effected, in case a driving maneuver is autonomously performed by the driver assistance system, and the passenger, in such a situation, can intervene to control the operation of the driver assistance system and thus the driving operation of the motor vehicle by a corresponding operation of the driver assistance system.

Moreover the device for operating the driver assistance system may include: means for determining whether a take-over of the motor vehicle by the driver is necessary during automatically performing the at least one driving maneuver, and means for issuing a warning message, in case it is determined that while automatically performing the at least one driving maneuver a take-over of the motor vehicle by the driver is necessary. In this way the occupants of the motor vehicle and in particular the driver of the motor vehicle can be alerted to driving situations in which it is necessary for the driver to retake control of the vehicle from the driver assistance system.

The motor vehicle may be a passenger car or a heavy goods vehicle.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
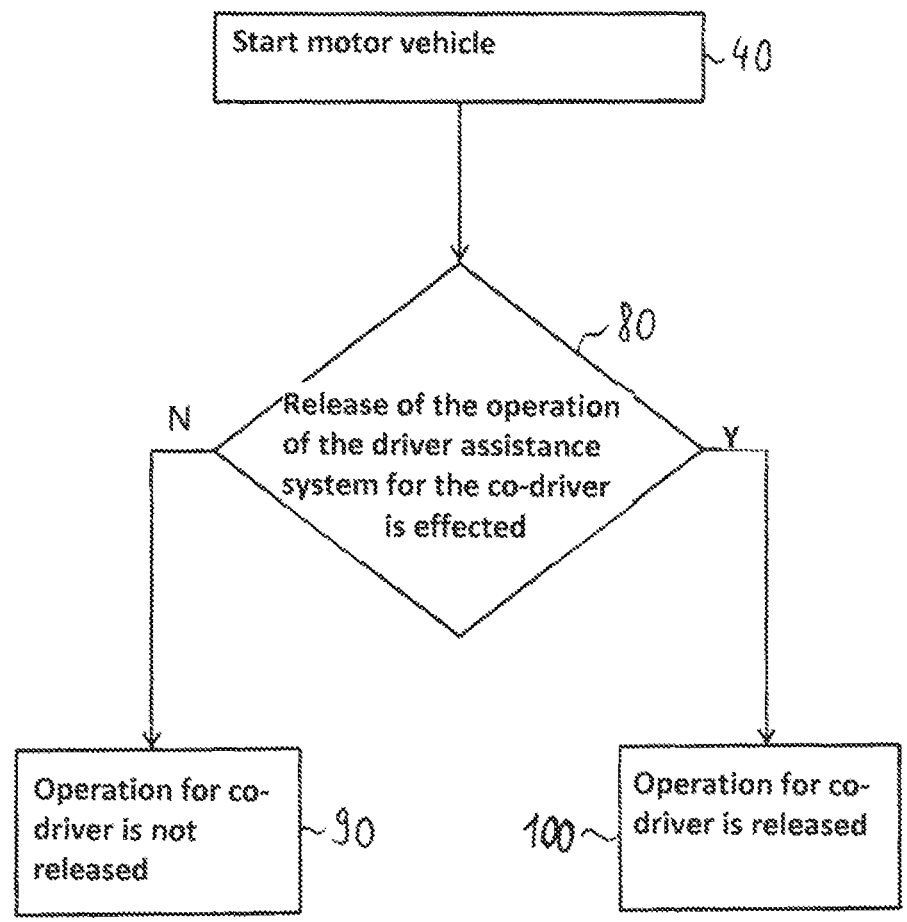
FIG. 1 shows a flow diagram of a method for operating a driver assistance system of a motor vehicle according to a first embodiment.

FIG. 1 shows a flow diagram of a method for operating a driver assistance system of a motor vehicle according to a first embodiment of the present disclosure.

The driver assistance system includes an actuating device which is configured for automatically actuating at least one element of the motor vehicle, selected from the group consisting of a brake unit, a drive unit and a steering unit. Further the driver assistance system includes an input device for entering a user request for performing at least one driving maneuver executable by the driver assistance system and a releasing device for releasing an operation of the driver assistance system. The driver assistance system may be configured, in particular, to automatically perform at least one driving maneuver selected from the group consisting of a lane change of the motor vehicle, braking a motor vehicle, driving the motor vehicle at a constant speed and driving the motor vehicle at a constant distance from a preceding vehicle.

In a step 40, the motor vehicle is started. At this stage the driver assistance system is released only for operation by a driver of the motor vehicle. Operation of the driver assistance system by a passenger of the motor vehicle is, however, not released.

In a step 80, it is determined whether a release for the driver assistance system to be operated by the passenger is effected by the driver of the motor vehicle by means of the releasing device. To this end, in case the releasing device includes a biometric person recognition device, it is determined, for example, on the basis of data ascertained by the biometric person recognition device, whether a release for the driver assistance system to be operated by the passenger is effected by the driver of the motor vehicle by means of the releasing device. Further, in case the releasing device includes an operating element arranged in the area of the foot well of the driver, a determining of an actuation of the operating element can be determined.

In case it is determined in step 80 that no release for the driver assistance system to be operated by a passenger of the motor vehicle is effected by a driver of the motor vehicle by means of the releasing device, release of the operation of the driver assistance system for the passenger of the motor vehicle does not take place, as shown in step 90. Operation of the driver assistance system by the passenger of the motor vehicle thus is still not released. Subsequently step 80 is repeatedly performed, i.e. it is again determined whether a release for the driver assistance system to be operated by a passenger of the motor vehicle is effected by a driver of the motor vehicle by means of the releasing device.

In case, however, it is determined in step 80 that a release for the driver assistance system to be operated by a passenger of the motor vehicle is effected by a driver of the motor vehicle by means of the releasing device, a release of the operation of the driver assistance system for the passenger of the motor vehicle is effected in step 100. Subsequently it can be determined in a further step whether the release by the driver of the motor vehicle has been revoked or cancelled. If this is the case, operation of the driver assistance system is no longer released for the passenger of the motor vehicle.

Figure 2:
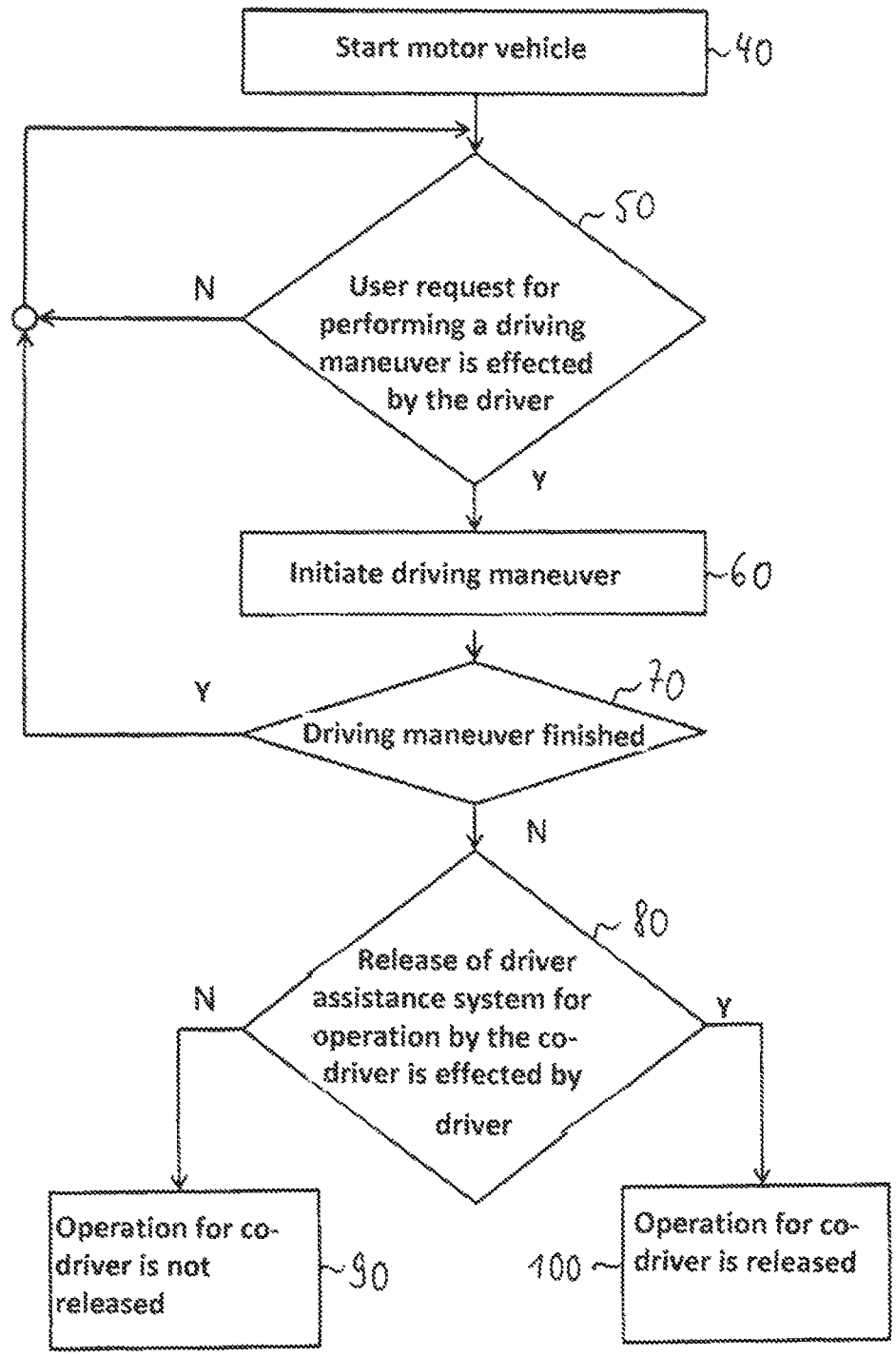
FIG. 2 shows a flow diagram of a method for operating a driver assistance system of a motor vehicle according to a second embodiment.

FIG. 2 shows a flow diagram of a method for operating a driver assistance system of a motor vehicle according to a second embodiment of the present disclosure.

Again the driver assistance system includes an actuating device which is configured for automatically actuating at least one element of the motor vehicle, selected from the group consisting of a brake unit, a drive unit and a steering unit. Further the driver assistance system includes at least one input device for entering a user request for performing at least one driving maneuver executable by means of the driver assistance system and a releasing device for releasing the operation of the driver assistance system. In particular, the driver assistance system may be configured to automatically perform at least one driving maneuver selected from the group consisting of a lane change of the motor vehicle, braking the motor vehicle, driving the motor vehicle at a constant speed and driving the motor vehicle at a constant distance to the preceding vehicle.

In a step 40, the motor vehicle is started. At this stage the driver assistance system is released only for operation by a driver of the motor vehicle. Operation of the driver assistance system by a passenger of the motor vehicle is, however, not released.

In a step 50, in the shown embodiment it is determined whether a user request for performing the at least one driving maneuver executable by means of the driver assistance system is effected by the driver of the motor vehicle by means of the input device. The input device may be configured, in particular, as an operating element of the motor vehicle. Furthermore a user request can be effected, for example, by means of a voice input or an input on a touchscreen. In case it is determined in step 50 that no user request for performing the at least one driving maneuver executable by the driver assistance system has been effected, step 50 is repeatedly performed.

If, however, it is determined in step 50 that a user request for performing the at least one driving maneuver executable by means of the driver assistance system is effected by the driver of the motor vehicle by means of the input device, the driving maneuver requested by the driver is initiated by the driver assistance system in a step 60 through a respective automatic actuation of the at least one element.

In step 70, it is determined whether the driving maneuver performed by the driver assistance system is finished. For example, in case the driving maneuver performed by the driver assistance system is an automatic lane change of the motor vehicle, it is determined whether the lane change has finished. In case it is determined in step 70 that the driving maneuver performed by the driver assistance system is finished, step 50 and possibly steps 60 and 70 are repeatedly performed.

If, on the other hand, it is determined in step 70 that the driving maneuver performed by the driver assistance system is not yet finished, it is determined in step 80 whether a release for the driver assistance system to be operated by the passenger of the motor vehicle is effected by the driver of the motor vehicle by means of the releasing device. This is effected in accordance with the step 80 of the first embodiment shown in FIG. 1.

If is determined in step 80 that no release for the driver assistance system to be operated by the passenger of the motor vehicle is effected by the driver of the motor vehicle by means of the releasing device, a release of the operation of the driver assistance system for the passenger of the motor vehicle does not take place, as shown in step 90, in accordance with step 90 of the first embodiment shown in FIG. 1. Thus an operation of the driver assistance system by the passenger of the motor vehicle is still not released. Subsequently steps 70 and possibly 80 are repeatedly performed, i.e. it is again determined whether the driving maneuver performed by the driver assistance system is finished, and if this is not the case, whether a release for the driver assistance system to be operated by the passenger of the motor vehicle is effected by the driver of the motor vehicle by means of the releasing device.

If, however, it is determined in step 80 that a release for the driver assistance system to be operated by the passenger of the motor vehicle is effected by the driver of the motor vehicle by means of the releasing device, a release of the operation of the driver assistance system for the passenger of the motor vehicle takes places in step 100. Subsequently it may be determined in a further step, whether the release is revoked or cancelled by the driver of the motor vehicle. If this is the case, operation of the driver assistance system for the passenger of the motor vehicle is no longer released. In addition it may be determined whether the driving maneuver performed by the driver assistance system is finished, and if this is the case, whether operation of the driver assistance system is no longer released for the passenger of the motor vehicle.

Figure 3:
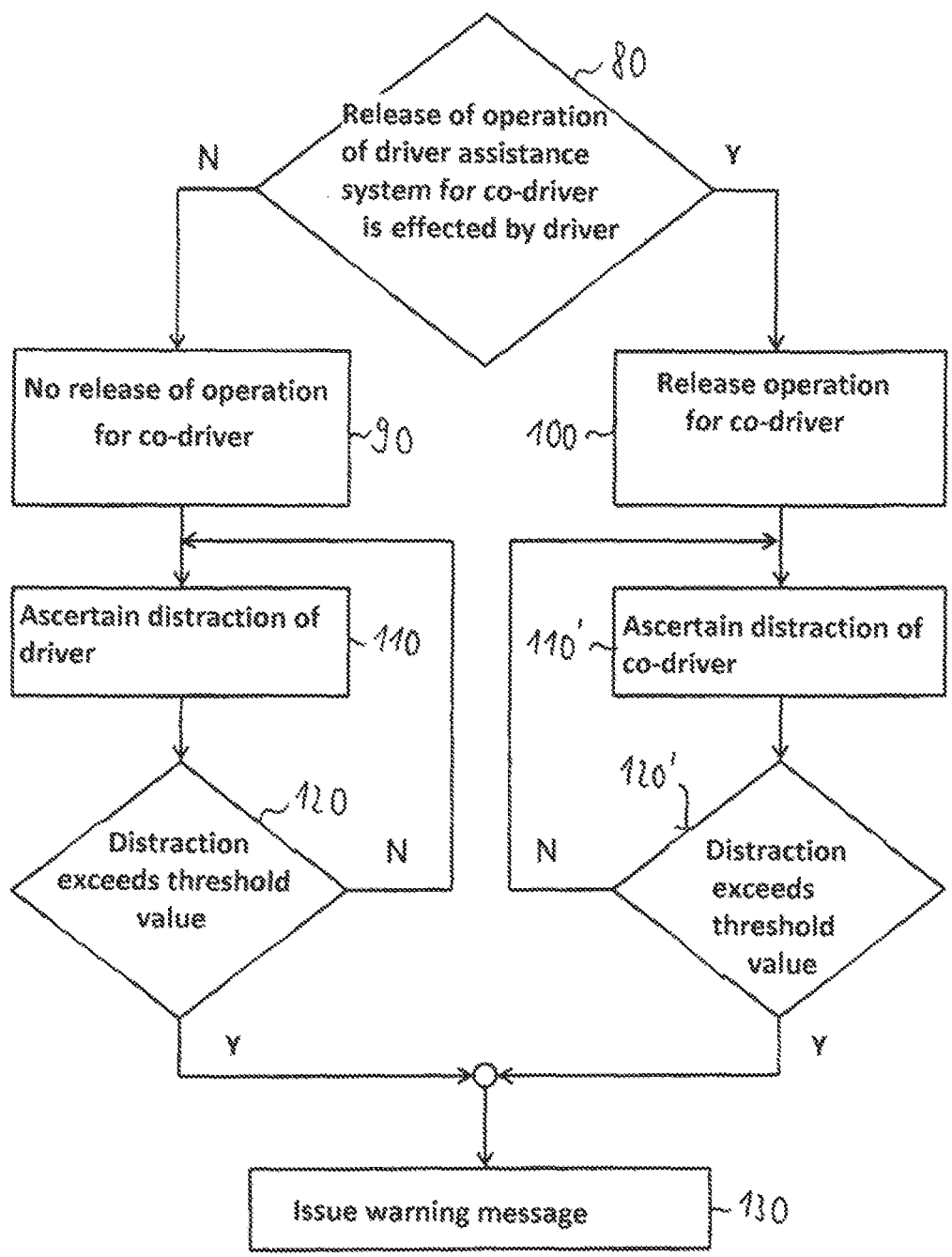
FIG. 3 shows a flow diagram of a method for operating a driver assistance system of a motor vehicle according to a third embodiment.

FIG. 3 shows a flow diagram of a method for operating a driver assistance system of a motor vehicle according to a third embodiment of the present disclosure.

Again the driver assistance system includes an actuating device which is configured for automatically actuating at least one element of the motor vehicle, selected from the group consisting of a brake unit, a drive unit and a steering unit. Further the driver assistance system includes an input device for entering a user request for performing at least one driving maneuver executable by means of the driver assistance system and a releasing device for releasing the operation of the driver assistance system. In particular, the driver assistance system may be configured to automatically perform at least one driving maneuver selected from the group consisting of a lane change of the motor vehicle, braking the motor vehicle, driving the motor vehicle at a constant speed and driving the motor vehicle at a constant distance to the preceding vehicle.

For reasons of clarity steps 40 to 70 shown in FIGS. 1 and 2 of the first and second embodiments are no longer shown in detail in FIG. 3. The steps may however also be performed in the third embodiment of the method. In a step 80 it is determined whether a release for the driver assistance system to be operated by the passenger of the motor vehicle is effected by the driver of the motor vehicle by means of the releasing device. This is performed in accordance with step 80 of the first embodiment shown in FIG. 1.

If it is determined in step 80 that no release for the driver assistance system to be operated by the passenger of the motor vehicle is effected by the driver of the motor vehicle by means of the releasing device, a release of the operation of the driver assistance system for the passenger of the motor vehicle does not take place, as shown in a step 90, in accordance with the step 90 of the first embodiment shown in FIG. 1.

In a step 110 at least one parameter characteristic of a possible distraction of the driver from a momentary traffic situation is ascertained by means at least one sensor of the motor vehicle. The at least one parameter characteristic of a possible distraction of the driver from a momentary traffic situation is selected e.g. from a group consisting of a viewing direction of the driver, a frequency with which the driver closes at least one eyelid and a speed with which the at least one eyelid of the driver is closed. The variables may be ascertained, for example, by means of an image evaluation of images captured by an optical camera. Further a body temperature and/or a pulse frequency of the driver may be ascertained by means of respective sensors. Further in step 110 a degree of distraction of the driver from the momentary traffic situation based on the at least one ascertained parameter is ascertained.

In a step 120 it is determined whether the determined degree of distraction of the driver from the momentary traffic situation exceeds a first predefined threshold value. In case the determined degree of distraction of the driver from the momentary traffic situation does not exceed the first predefined threshold value, steps 110 and 120 are repeatedly performed. In case the determined degree of distraction of the driver from the momentary traffic situation does however exceed the first predefined threshold value, a warning message is issued in a step 130 by means of an output device of the motor vehicle, e.g. by means of an optical and/or acoustic output device.

In case it is determined in step 80 that a release for the driver assistance system to be operated by the passenger of the motor vehicle is effected by the driver of the motor vehicle by means of the releasing device, a release of the operation of the driver assistance system for the passenger of the motor vehicle is effected.

In a step 110' at least one parameter characteristic of a possible distraction of the passenger from a momentary traffic situation is ascertained by means of at least one sensor of the motor vehicle in accordance with step 110. Further in step 110' a degree of distraction of the passenger from the momentary traffic situation is ascertained on the basis of the at least one ascertained parameter.

In a step 120' it is determined corresponding to step 120, whether the determined degree of distraction of the passenger from the momentary traffic situation exceeds a second predefined threshold value. The second predefined threshold value may correspond to the first predefined threshold value.

In case the determined degree of distraction of the passenger from the momentary traffic situation does not exceed a second predefined threshold value, steps 110' and 120' are repeatedly performed. In case the determined degree of distraction of the passenger from the momentary traffic situation however exceeds a second predefined threshold value, a warning message is issued by means of the output device of the motor vehicle, as shown again in step 130.

Figure 4:
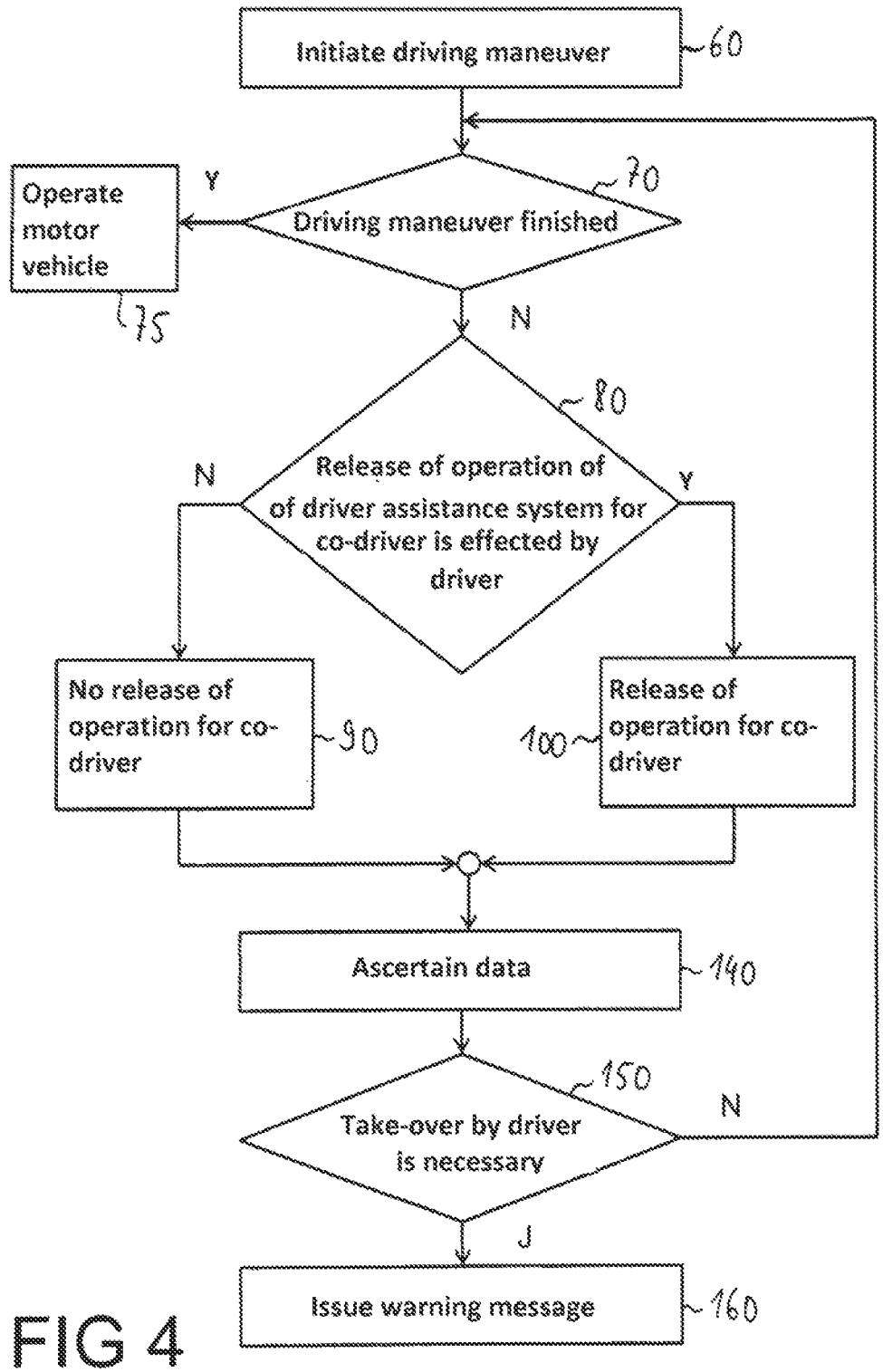
FIG. 4 shows a flow diagram of a method for operating a driver assistance system of a motor vehicle according to a fourth embodiment.

FIG. 4 shows a flow diagram of a method for operating a driver assistance system of a motor vehicle according to a fourth embodiment of the present disclosure.

Again the driver assistance system includes an actuating device which is configured for automatically actuating at least one element of the motor vehicle, selected from the group consisting of a brake unit, a drive unit and a steering unit. Further the driver assistance system includes an input device for entering a user request for performing at least one driving maneuver executable by means of the driver assistance system and a releasing device for releasing the operation of the driver assistance system. In particular, the driver assistance system may be configured to automatically perform at least one driving maneuver selected from the group consisting of a lane change of the motor vehicle, braking the motor vehicle, driving the motor vehicle at a constant speed and driving the motor vehicle at a constant distance to the preceding vehicle. For reasons of clarity steps 40 and 50 shown in FIG. 2 of the second embodiment are no longer shown in detail in FIG. 4. The steps may however also be performed in the fourth embodiment of the method.

In a step 60 the driving maneuver requested by the driver is again initiated by the driver assistance system by an automatic actuation of the at least one element, corresponding to step 60 of the second embodiment shown in FIG. 2.

In a step 70 it is determined whether the driving maneuver performed by the driver assistance system is finished. For example, if the driving maneuver performed by the driver assistance system is an automatic lane change of the motor vehicle, it is determined whether the lane change has finished. If it is determined in step 70 that the driving maneuver performed by the driver assistance system is finished the motor vehicle is again controlled by the driver as shown in a step 75. If, however, it is determined in step 70 that the driving maneuver performed by the driver assistance system is not yet finished, it is determined in a step 80 whether a release for the driver assistance system to be operated by the passenger of the motor vehicle is effected by the driver of the motor vehicle by means of the releasing device. This is effected corresponding to a step 80 of the second embodiment shown in FIG. 2.

If it is determined in step 80 that no release for the driver assistance system to be operated by the passenger of the motor vehicle is effected by the driver of the motor vehicle by means of the releasing device, a release of the operation of the driver assistance system for the passenger of the motor vehicle does not take place, as shown in a step 90, corresponding to step 90 of the second embodiment shown in FIG. 2. If, however, it is determined in step 80 that a release for the driver assistance system to be operated by the passenger of the motor vehicle is effected by the driver of the motor vehicle by means of the releasing device, a release of the operation of the driver assistance system for the passenger of the motor vehicle is effected in step 100, corresponding to step 100 of the second embodiment shown in FIG. 2.

In a step 140 data is ascertained from at least one sensor of the motor vehicle, by means of which it can be determined whether a take-over of the motor vehicle by the driver is necessary. For example, if the driving maneuver performed by the driver assistance system is executed only at speeds which exceed a predefined threshold value or only on a predefined type of road such as a motorway, the momentary speed of the motor vehicle or the momentary type of road on which the motor vehicle travels is determined.

In a step 150 it is determined based on data ascertained in a step 140, whether a take-over of the motor vehicle by the driver is necessary during automatic execution of the at least one driving maneuver. For example it is determined whether the momentary speed of the motor vehicle lies below the predefined threshold value, or whether the threshold value drops below the predefined threshold value within a predefined time duration, e.g. 10 seconds. If it is determined in step 150 that no take-over of the motor vehicle by the driver is necessary during automatic execution of the at least one driving maneuver, steps 70 and, as required, steps 80, 90 or 100, 140 and 150 are repeatedly performed. If however it is determined in step 150 that a take-over of the motor vehicle by the driver is necessary during automatic execution of the at least one driving maneuver, a warning message is issued in step 160 by means of an output device of the motor vehicle, e.g. an optical and/or acoustic output device.

It is thus possible by means of the shown embodiment that a driver assistance system, which for example controls a vehicle fully autonomously, can be switched over, at least partially, into a "co-pilot operation." During this process authority is passed from the driver to the passenger to control certain functions autonomously supported by the system. This may include initiating an autonomously executed lane change, route changes and speed settings.

During "co-pilot operation," the driver continues to be in a position of monitoring the system and to intervene as necessary. On the other hand "co-pilot operation" allows the driver for example to relax since now the passenger takes over control of the system and monitors road traffic and the driver can take his eyes off the road. Further in "co-pilot operation" the passenger can be monitored by the system and both the driver and passenger can be prevented from becoming simultaneously inattentive. If it is necessary for the driver to retake control of the vehicle he can be warned in good time.

Furthermore the passenger, in one implementation of the method, can in an emergency place the vehicle into "emergency mode", i.e. also in a case in which no release for the driver assistance system to be operated by the passenger of the motor vehicle has been effected by the driver of the motor vehicle by means of the releasing device, and operation of the driver assistance system for the passenger of the motor vehicle has not been released. Thus in an emergency the passenger can safely park the vehicle with support from the system. In emergency mode the hazard warning light may e.g. be activated, vehicle-to-vehicle warnings may be initiated in order to warn other vehicles and the vehicle can be controlled at reduced speed until it has reached an emergency stop bay.

During autonomous driving the passenger can control the vehicle with certain restrictions in order to give the driver more time to relax. Further the possibility of having the passenger monitoring the vehicle presents an additional safeguard for autonomous driving because when in doubt, the passenger can intervene if the driver is unable to do so.

Figure 5:
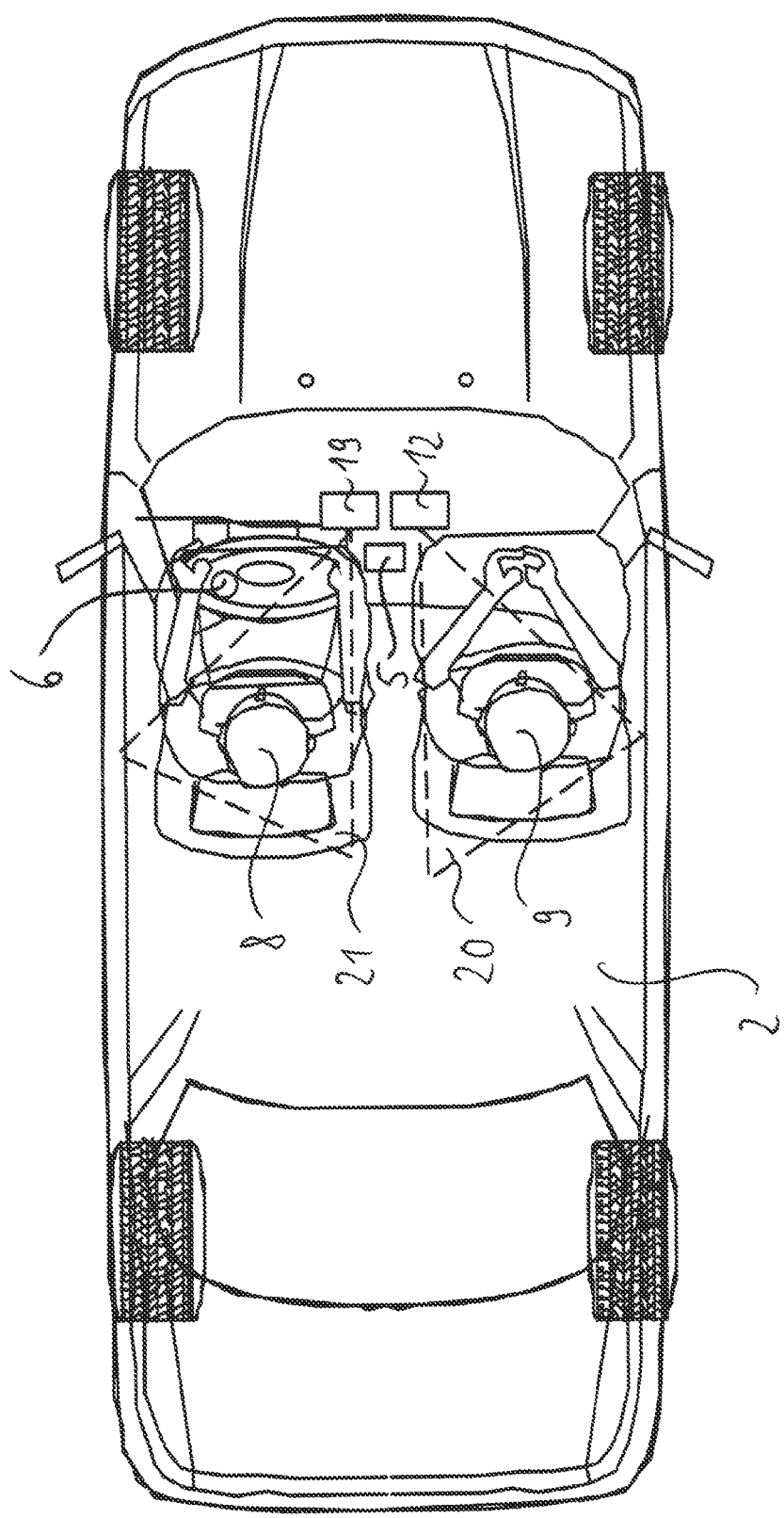
FIG. 5 shows a motor vehicle according to an embodiment of the present disclosure.

FIG. 5 shows a motor vehicle 2 in the form of a passenger car with a driver assistance system according to an embodiment of the present disclosure. In FIG. 5, a roof of the motor vehicle 2 has been partially omitted in order to show the internal space of the motor vehicle 2. The driver assistance system includes an input device 5 arranged in the area of a center console of the motor vehicle 2 for entering a user request for at least one driving maneuver executable by means of the driver assistance system and a releasing device 6 arranged in the area of a steering wheel of the motor vehicle 2 for releasing an operation of the driver assistance system. The input device 5 is e.g. configured as an operating element, in particular as a touchscreen.

A driver 8 of the motor vehicle 2 is shown at least partially within a schematically drawn detection range 21 of a sensor 19. Further a passenger 9 of the motor vehicle 2 is at least partially drawn within a schematically drawn detection range 20 of a sensor 12. The sensors 12 and 19 are e.g. configured as an optical camera and arranged in the area not shown in detail, of an internal mirror of the motor vehicle 2. By means of sensor 19 a parameter can be ascertained, which is characteristic of a possible distraction of the driver 8 from a momentary traffic situation. Further a parameter may be ascertained by means of the sensor 12, which is characteristic of a possible distraction of the passenger 9 from a momentary traffic situation. As explained in more detail below, it can be determined in the shown embodiment whether a release for the driver assistance system to be operated by the passenger 9 of the motor vehicle 2 is effected by the driver 8 of the motor vehicle 2 by means of the releasing device 6.

Figure 6:
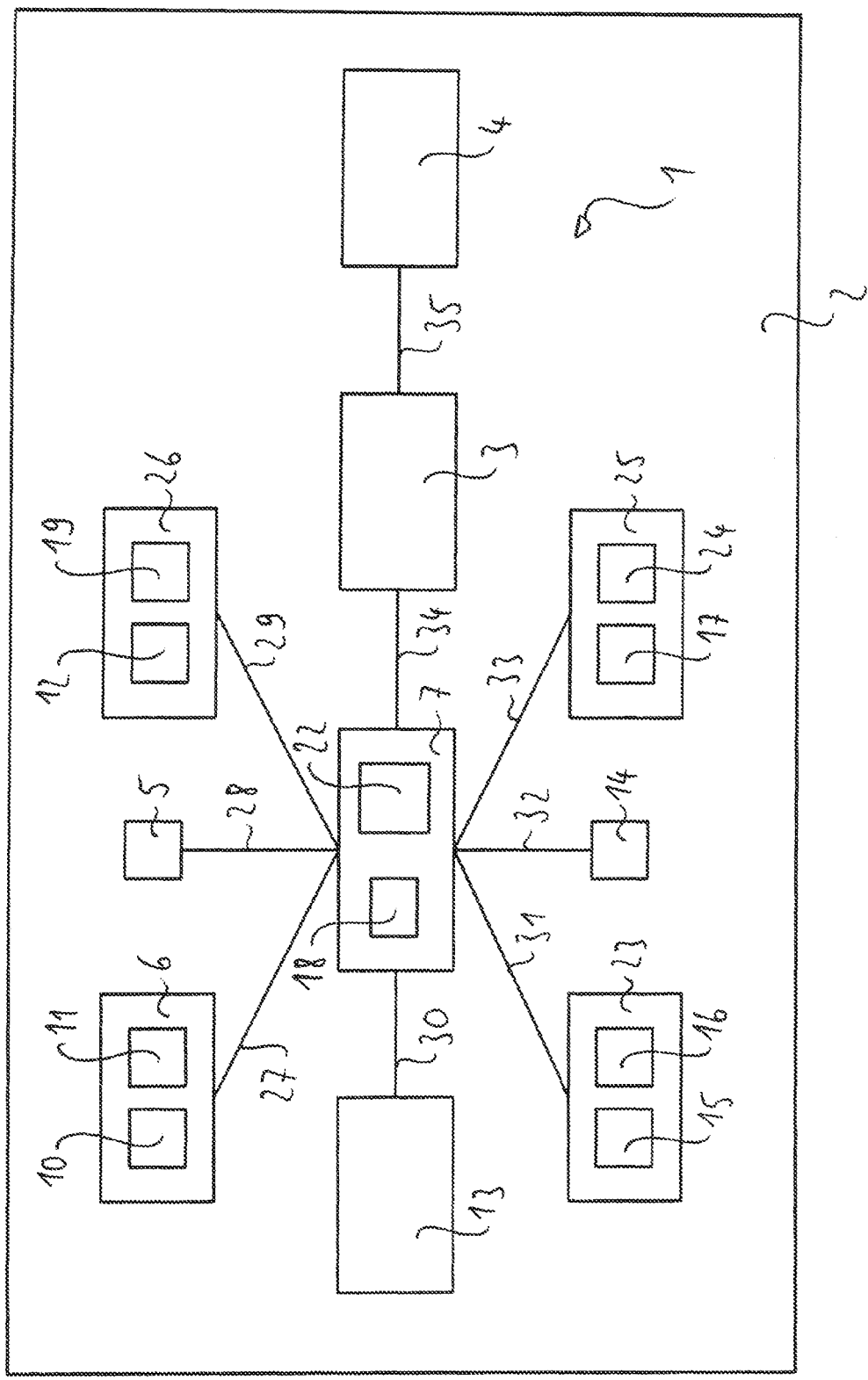
FIG. 6 shows components of the motor vehicle of FIG. 5.

To this end FIG. 6 shows components of the motor vehicle 2 shown in FIG. 5 and in particular a driver assistance system 1 of the motor vehicle 2 according to an embodiment of the present disclosure. Components with the same functions as in FIG. 5 have been marked with the same reference symbols and will not be explained again in detail. For reasons of clarity the motor vehicle 2 in FIG. 6 is shown merely schematically.

The driver assistance system 1 in the shown embodiment includes an actuation device 3 which is configured for automatic actuation of at least one element 4 of the motor vehicle 2 selected from the group consisting of a brake unit, a drive unit and a steering unit. The actuation device 3 is connected via a signal line 35 with the at least one element 4. Further the driver assistance system 1 in the shown embodiment includes a computer unit 7 in addition to the input device 5 and the releasing device 6 as well as the sensors 12 and 19 which are part of a sensor unit 26.

The computer unit 7 includes a computer-readable medium 18 and a processing unit 22. The processing unit 22 may e.g. be configured as an electronic processor, in particular a microprocessor, microcontroller or application-specific integrated circuit (ASIC). The computer-readable medium 18 may e.g. be configured as a flash memory. The computer-readable medium 18 has a computer program product according to one of the above-mentioned embodiments stored on it, which when executed on the computer unit 7, instructs the computer unit 7 to execute the steps explained in conjunction with the embodiments, in particular the steps of the procedures shown in FIGS. 1 to 4. To this end the computer unit 7 is connected via a signal line 27 with the releasing device 6, via a signal line 28 with the input device 5 and via a signal line 29 with the sensor unit 26.

The releasing device 6, in the shown embodiment, includes a biometric person recognition device 10 as well as an operating element 11 arranged in the area of a foot well of the driver.

The driver assistance system 1 in the shown embodiment is configured to automatically perform at least one driving maneuver based on data ascertained from at least one sensor 14 of the motor vehicle 2, wherein the at least one sensor 14 is configured for detecting objects in the area of an environment of the motor vehicle 2. To this end the computer unit 7 is connected via a signal line 32 with the at least one sensor 14.

The at least one sensor 14 is e.g. selected from the group consisting of an electromagnetic sensor, in particular a radar sensor or a lidar sensor, an acoustic sensor, in particular an ultrasound sensor or an optical camera.

Further the driver assistance system 1 is configured to automatically perform at least one driving maneuver based on data received from a vehicle-to-vehicle communication device 15 and/or a vehicle-to-infrastructure communication device 16 of the motor vehicle. To this end the computer unit 7 is connected via a signal line 31 with a communication unit 23 of the motor vehicle 2, wherein the vehicle-to-vehicle communication device 15 and/or a vehicle-to-infrastructure communication device 16 are part of the communication unit 23.

Furthermore the driver assistance system 1 is configured to automatically perform at least one driving maneuver based on map data stored in a storage device 17. To this end the computer unit 7 is connected via a signal line 33 with a navigation system 25 of the motor vehicle 2. In this way a momentary position of the motor vehicle 2 can be ascertained by means of a positioning device 24 of the navigation system 25 and map data stored in the storage device 17 of the navigation system 25 can be retrieved, which relate to a road on which the motor vehicle 2 currently travels.

The driver assistance system 1 may, in particular, be configured to automatically perform at least one driving maneuver selected from the group consisting of a lane change of the motor vehicle 2, braking the motor vehicle 2, driving the motor vehicle 2 at a constant speed and driving the motor vehicle 2 at a constant distance from a preceding motor vehicle.

The driver assistance system 1 in the shown embodiment is further configured for issuing a warning message by means of an output device 13 of the motor vehicle 2, in case an ascertained degree of distraction of the driver or passenger of the motor vehicle 2 from the momentary traffic situation exceeds a predefined value. Moreover the driver assistance system 1 in the shown embodiment is configured to issue a warning message by means of the output device 13, in case it is determined that during executing the at least one driving maneuver a take-over of the motor vehicle 2 by the driver is necessary. To this end the computer unit 7 is connected via a signal line 30 with the output device 13, which e.g. may be configured as an optical and/or acoustic output device.

Furthermore the computer unit 7 is connected via a signal line 34 with the actuation device 3.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A driver assistance system for a motor vehicle comprising:
   an actuator configured to automatically actuate at least one element of the motor vehicle selected from the group consisting of a brake unit, a drive unit and a steering unit;
   an input device for entering a user request for a driving maneuver executable by the driver assistance system;
   a releasing device for releasing an operation of the driver assistance system; and
   a processing unit configured to run a computer program product which instructs the unit for executing the following:
      determining whether a first occupant in the motor vehicle has effected a release of the driver assistance system with the releasing device for operation of the at least one element of the motor vehicle by a second occupant in the motor vehicle; and releasing the driver assistance system to the second occupant for operation of the at least one element thereby in response to the release.

2. The driver assistance system according to claim 1, wherein the releasing device comprises a biometric person recognition device; and wherein determining whether a release for the driver assistance system to be operated by the second occupant is effected by the first occupant by the releasing device is effected on the basis of data ascertained by the biometric person recognition device.

3. The driver assistance system according to claim 1, wherein the releasing device comprises an operating element in a foot well area of the first occupant; and wherein determining whether a release for the driver assistance system to be operated by the second occupant is effected by the first occupant by actuation of the operating element.

4. The driver assistance system according to claim 1, further comprising:
a first sensor for ascertaining at least one parameter characteristic of a possible distraction of the second occupant from a momentary traffic situation; and
an output device for issuing a warning message;
wherein when the release for the driver assistance system to be operated by the passenger is effected by the first occupant by the releasing device, the computer program product instructs the processing unit to execute the following:
ascertaining a degree of distraction of the second occupant from the momentary traffic situation based on the at least one ascertained parameter; and
issuing the warning message by the output device when the degree of distraction of the second occupant from the momentary traffic situation exceeds a predefined threshold value.

5. The driver assistance system according to claim 1, wherein the driver assistance system further comprises a second sensor for detecting objects in an area adjacent to the motor vehicle, wherein the driver assistance system is configured to automatically perform the driving maneuver based on data ascertained from the second sensor of the motor vehicle.

6. The driver assistance system according to claim 1, wherein the driver assistance system further comprises a communication device for receiving data from at least one of a vehicle-to-vehicle communication device or a vehicle-to-infrastructure communication device, wherein the driver assistance system is configured to automatically perform the driving maneuver based on data received by the communication device.

7. The driver assistance system according to claim 1 further comprising a storage device having map data stored thereon, wherein the driver assistance system is configured to automatically perform the driving maneuver based on the map data stored in the storage device.

8. A method for operating a driver assistance system of a motor vehicle, wherein the driver assistance system includes an actuator configured to automatically actuate at least one element of the motor vehicle selected from the group consisting of a brake unit, a drive unit and a steering unit, an input device for entering a user request for a driving maneuver executable by the driver assistance system and a releasing device for releasing an operation of the driver assistance system, the method comprising:

determining whether a release for the driver assistance system to be operated by the second occupant of the motor vehicle is effected by a first occupant of the motor vehicle by the releasing device; and releasing the operation of the driver assistance system for the second occupant when the release for the driver assistance system to be operated by the second occupant of the motor vehicle is effected by the first occupant of the motor vehicle by the releasing device.

9. The method according to claim 8, further comprising determining whether a release for the driver assistance system to be operated by the second occupant is effected by the first occupant of the motor vehicle by the releasing device is effected on the basis of data ascertained from a biometric person recognition device.

10. The method according to claim 8, further comprising determining whether a release for the driver assistance system to be operated by the second occupant is effected by the first occupant of the motor vehicle by the releasing device is effected on the basis of an actuation of an operating element arranged in a foot well area of the first occupant.

11. The method according to one of claim 8, further comprising:
ascertaining at least one parameter characteristic of a possible distraction of the second occupant from a momentary traffic situation by a first sensor of the motor vehicle;
ascertaining a degree of distraction of the second occupant from a momentary traffic situation based on the at least one ascertained parameter; and
issuing a warning message when the ascertained degree of distraction of the second occupant from the momentary traffic situation exceeds a predefined threshold value.

12. The method according to one of claim 8, further comprising:
determining whether a user request for performing a driving maneuver executable by means of the driver assistance system is effected by the first occupant of the motor vehicle by the input device; and
automatically performing the driving maneuver when the user request for performing the driving maneuver is effected by the first occupant of the motor vehicle by the input device;
wherein determining, whether a release for the driver assistance system to be operated by the second occupant of the motor vehicle is effected by the first occupant of the motor vehicle by the releasing device is effected during automatic execution of the driving maneuver.

13. The method according to claim 12, further comprising:
determining whether a take-over of the motor vehicle by the first occupant is necessary during automatic execution of the driving maneuver; and
issuing a warning message when it is determined that a take-over of the motor vehicle by the first occupant is necessary during automatic execution of the driving maneuver.

14. A non-transitory computer-readable medium with computer executable instructions stored thereon which are executable on a processor for operating a driver assistance system of the motor vehicle having an actuator configured for automatic actuation of at least one element of the motor vehicle selected from the group consisting of a brake unit, a drive unit and a steering unit, an input device for entering a user request for at least one driving maneuver executable by the driver assistance system and a releasing device for releasing an operation of the driver method comprising:
- determining whether a first occupant in the motor vehicle has effected a release of the driver assistance system for operation of the at least one element of the motor vehicle by a second occupant in the motor vehicle; and
- releasing the driver assistance system to the second occupant for operation of the at least one element thereby in response to the release.

* * * * *